March 20, 1951  G. M. HOLLEY, JR., ET AL  2,545,698
GAS TURBINE GOVERNOR
Filed April 16, 1947  2 Sheets-Sheet 1

Geo. M. Holley Jr.
A. W. Orr Jr.
INVENTOR.

BY
*Stanley M Udale*
ATTORNEY

March 20, 1951     G. M. HOLLEY, JR., ET AL     2,545,698
GAS TURBINE GOVERNOR
Filed April 16, 1947     2 Sheets-Sheet 2
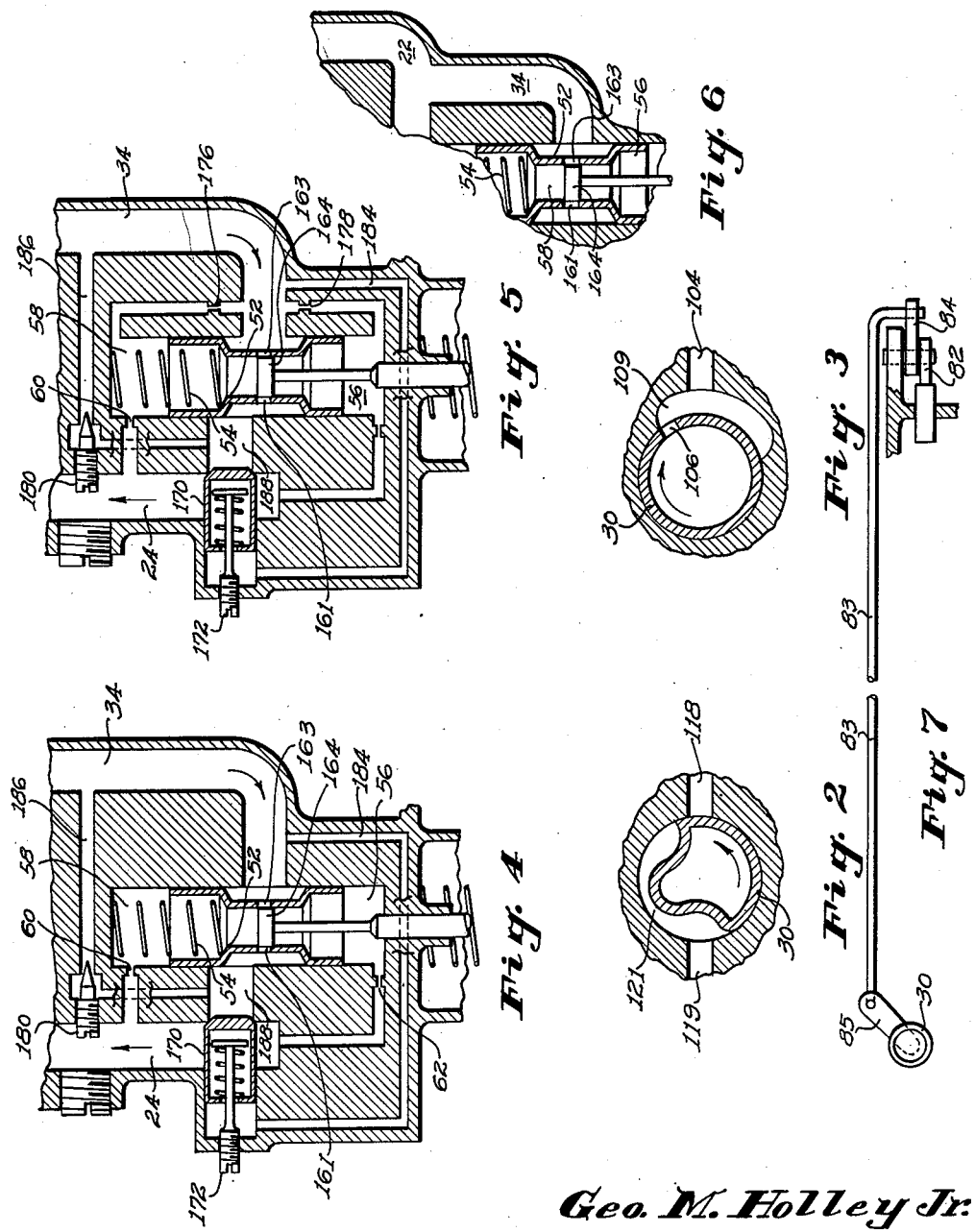
Geo. M. Holley Jr.
A. W. Orr Jr.
INVENTOR.
BY
ATTORNEY Patented Mar. 20, 1951

2,545,698

UNITED STATES PATENT OFFICE 2,545,698

GAS TURBINE GOVERNOR

George M. Holley, Jr., Grosse Pointe, and Andrew William Orr, Jr., Detroit, Mich., assignors to George M. Holley and Earl Holley Application April 16, 1947, Serial No. 741,908

7 Claims. (Cl. 60—41)

The object of this invention is to regulate the speed of a gas turbine.

Fig. 2 shows a cross-sectional elevation taken on the plane 2—2 of Fig. 1 showing a detail of the manually operated control valve.

Fig. 3 shows a cross-sectional elevation taken on the plane 3—3 of Fig. 1 showing another detail of the manually operated control valve.

Fig. 4 shows a modification of the acceleration bypass valve.

Fig. 5 is an alternative showing a modification of the acceleration bypass valve.

Fig. 6 is another alternative showing a modification of the acceleration bypass valve.

Fig. 7 shows the inter-connection between the speed control and the fuel control.

Figure 1:
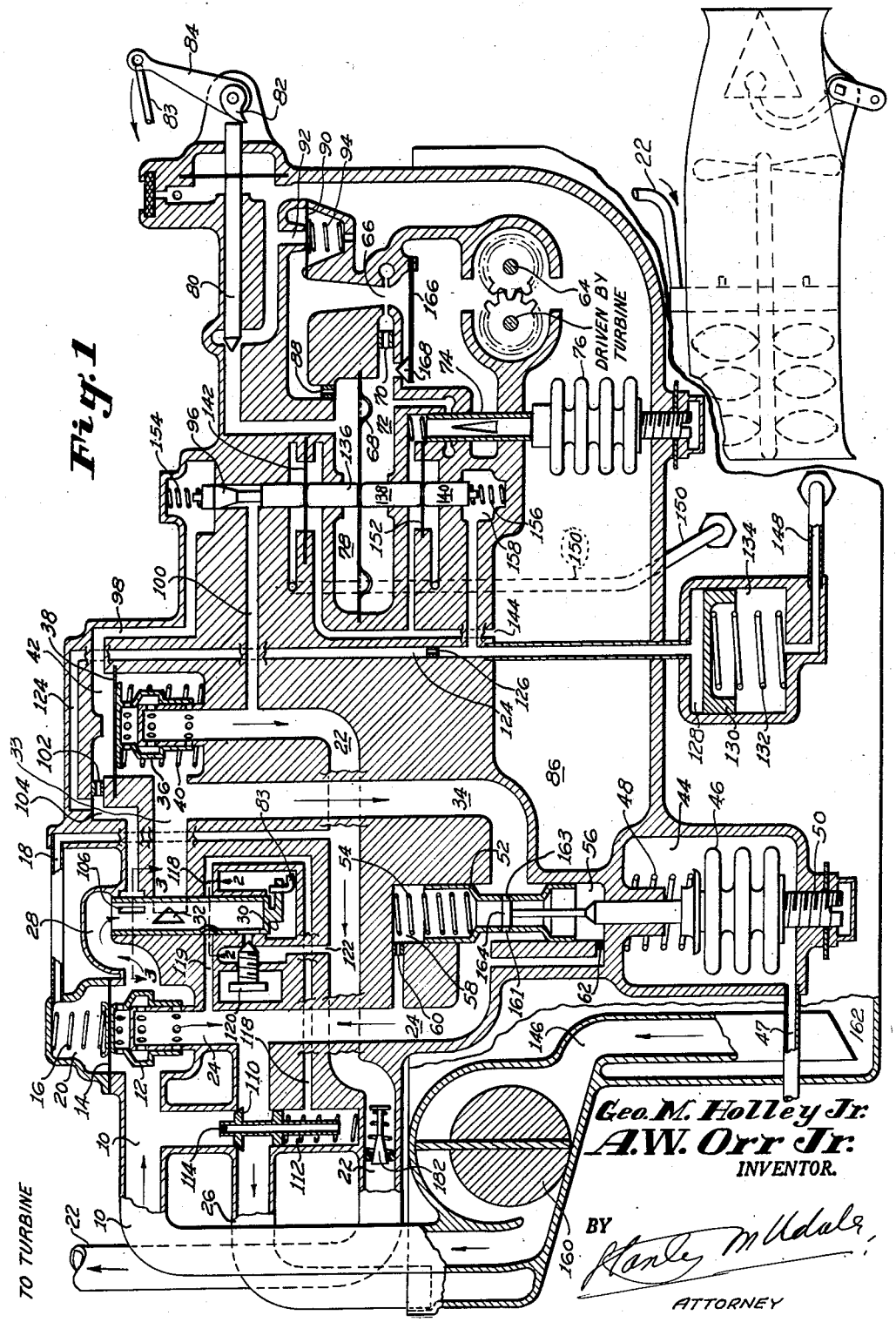
Fig. 1 shows a cross-sectional elevation of the preferred form of our invention.

In Fig. 1, the fuel is contained in the tank 162, flows along the passage 146, past the pump 160 to the fuel entrance 10 and flows past the first balanced constant pressure valve 12. This balanced constant pressure valve 12 is carried by a diaphragm 14. The spring 16 engages with this diaphragm 14. Pipe 18 connects the chamber 20, above the diaphragm 14 to the fuel discharge passage 22. Fuel escaping past the valve 12 flows through passage 24 which conveys fuel to the return passage 26 to the tank 162.

Fuel flowing past the valve 12 flows through passage 28 to the inside of the hollow valve 30. Triangular port 32 admits a variable quantity of fuel to the passage 33. This quantity is determined by the position of the valve 30 which is manually controlled.

Fuel flows from the manually controlled valve 30 to the second balanced valve 36, mounted on the diaphragm 38 which is supported by the light spring 40. Spring 40 may be omitted. Fuel which escapes through valve 36 flows down the pipe 22 to the turbine. In order to maintain a pressure in the passage 22 a pressure responsive valve 182 is located as shown. The acceleration bypass valve 52 is controlled by means responsive to the atmospheric pressure conducted through the pipe 47. The atmospheric pressure is applied to the chamber 44 containing the evacuated bellows 46, the compression spring 48 and the adjustment 50. When the atmospheric pressure falls the bellows 46 expand and the servomotor valve 164 rises uncovering the ports 161—163. The pressure in passage 34 is admitted to the chamber 56 which is greater than the pressure in chamber 58 which is connected through the restriction 60 with the low pressure passage 24. Valve 52 is thus free to move in response to this pressure difference in order to restore the balanced condition in which the pressure difference between chambers 56 and 58 just balances the pressure exerted by the spring 54. The balance valve 52 is thus moved up uncovering the path leading from the passage 34 to the passage 24. Passage 24 communicates with the return passage 26. Hence, the more the valve 52 opens the less is the quantity of fuel that is discharged through the discharge passage 22. A compression spring 54 engages with the valve 52.

To prevent any surging the chamber 56, below the valve 52, and the chamber 58, above the valve 52, communicate with the passage 24 through the restricted openings 60 and 62. These restrictions make the movement of the servomotor valve 164 small before the valve 52 responds.

The speed of the turbine is regulated by a governor, the essential elements of which are shown on the right hand side of Fig. 1.

A gear pump 64, driven by the turbine, discharges hydraulic fluid through the venturi 66 from the tank 86. A diaphragm 68 is subjected on its lower side to the pressure in the throat of the venturi 66, which pressure is transmitted through a restriction 70. The low pressure in the chamber 72, below the diaphragm 68, is to a certain extent neutralized by the cylindrical valve 74. Cylindrical valve 74 is pushed up by the evacuated capsule 76, at high altitudes, so that the pressure drop in the venturi 66 is not so effective at high altitudes at a given turbine speed.

The chamber 78, above the diaphragm 68, communicates with the low pressure side of the oil pump 64, past the manually controlled valve 80, controlled by the cam 82, and the lever 84. The lever 84 may be linked to the valve 30 through the link 83 so that the fuel valve is opened as the speed is increased. When cam 82 is rotated anti-clockwise the valve 80 is opened and the chamber 78 is placed in a more-or-less restricted communication with the chamber 86, which is the low pressure side of the oil pump 64 and is substantially at atmospheric pressure.

The pressure in chamber 78 increases as the speed increases by the flow of oil under pressure through the restriction 88. At all speeds the diaphragm 90, spring 94 and port 92 maintain a pressure in the chamber 78.

A regulating valve 96 is moved in response to pressure differences between the chamber 72 and the chamber 78. This valve 96 is located at the junction of the fuel passage 98 and the fuel passage 100. When the valve 96 descends, because the pressure in chamber 78 exceeds the pressure in chamber 72, then the flow down passage 98, along the passage 100 to the discharge passage 22 decreases and suddenly ceases. Pressure in the chamber 42, above the diaphragm 38, then rises because there is then no drop through the restriction 102. The flow through the restriction 102 determines the pressure in the chamber 42. The pressure in the chamber 42 determines the opening of the balanced valve 36.

The flow through the restriction 102 is derived from the passage 104. The flow through passage 104 flows through the port 106 in the valve 30, as shown in Fig. 3. Fig. 3 shows the connection from the inside of the valve 30 through the narrow port 106 to the semi-annular passage 109. Semi-annular passage 109 communicates with the passage 104.

The needle valve 120 controls the minimum flow of fuel past the valve 12, along the inside of the valve 30, and along the passage 122 to the outlet passage 22. The fuel flowing through the passage 104 divides and a portion goes through a passage 124, past the restriction 126 into chamber 128 and applies pressure to the upper side of the piston 130 and compresses the spring 132. The chamber 134, below the piston 130, is connected through the pipe 148 to the fuel tank 162. The remaining fuel goes through the restriction 102 as described above.

The valve 96 engages with the pins 136—138—140. A small diaphragm 142 is located between the valve 96 and the pin 136. The chamber below the diaphragm 142 is connected through the passage 144 with the low pressure oil tank 86. The chamber above the small diaphragm 142 is connected through the passage 150 with the fuel tank 162. The small diaphragm 152 is located between the pins 138—140. The chamber on the upper side of the small diaphragm 152 and the chamber on the lower side of the small diaphragm 142 are both connected through the passage 144 with the low pressure oil tank 86. The chamber below the diaphragm 152 is connected to the pipe 150.

A spring 154 pushes the valve 96 down. A spring 156 pushes the valve 96 up. The spring 156 is contained in the chamber 158. Chamber 158 is also connected to the chamber 128 on the downstream side of the restriction 126.

The thermostatic metal 166 controls a valve 168 to correct for changes in oil density and viscosity. Normally the valve 168 will be closed.

In Fig. 2 fuel is shown flowing along the passage 119 to a semi-annular depression 121 in the valve 30 so that when the triangular port 132 is closed and the port 106 is closed, by the rotation of the valve 30, the passage 119 is put in communication with the passage 118. When the passage 118 is in communication with the passage 119 valve 110 is open because there is a sudden drop of pressure through the restriction 114. The valve 110 thus opens and the pressure in the pipe 10 is released past the valve 110 into the return pipe 26. The valve 110 is normally supported by the spring 112 in the position it is shown.

In Fig. 4 the valve 52 is shown together with the restricted communication 60 connecting the chamber 58 with the passage 24 and the restricted communication 62 connecting the chamber 56 with the passage 24. Servomotor valve 164 and the ports 161—163 function as before.

In addition constant pressure valve 170 is added. A spring tends to open this valve. This spring is adjusted by an adjusting screw 172. The high pressure tending to close this valve 170 is communicated through the passage 184 connecting the high pressure passage 34 with the left face of the piston 170. An adjusting screw 180 controls the flow through a bypass 186 from the passage 34, with the passage 188 immediately to the right of the valve 170, and to the left of the valve 52.

Fig. 5 is similar to Fig. 4 with the addition of the two restricted passages 176 and 178. Restricted passage 176 places the chamber 58 in restricted communication with the high pressure passage 34. The restricted passage 178 places the chamber 56 in restricted communication with the high pressure passage 34.

Fig. 6 shows the escape passage 34 connected with the fuel discharge passage 22 instead of being connected to the discharge passage 33.

The lever 84 in Figs. 1 and 7 is shown connected by the link 83 with the lever 85 projecting from the end of the fuel valve 30. The right hand end of the link 83 engages with the right hand end of the lever 84. The lever 84 controls the position of the cam 82. The position of the cam 82 determines the position of the speed regulating pin 80.

Operation

In the operation when the valve 30 is in the position shown in Figs. 1, 2 and 3 the low speed needle 120 is admitting a small quantity of fuel to the passage 122 and the triangular port 32 is admitting a small quantity of fuel to the passage 33. The port 106 is open as shown in Fig. 3. The drop of pressure across the triangular port 32 is regulated by the diaphragm 38 and by the spring 40, when a spring is used. This produces a definite flow of fuel which varies with the area of the port 32 which is opened by the rotation of the valve 30 and also by the drop of pressure across the triangular port 32 controlled by the valve 36.

The speed of the turbine depends upon the amount of fuel supplied. Hence, as the valve 30 is opened the speed increases. The top speed at which the turbine is held is determined by the rotation of the pump 64 which is driven by the gas turbine.

When the speed is selected by the lever 84 the diaphragm 68 responds to the pressure difference created in the throat of the venturi 66 as modified by the position of the valve 74 which depends on the atmospheric pressure which exists in the oil tank 86. The atmospheric pressure acts on the evacuated bellows 76 to increase the leakage past the valve 74 at high altitudes.

Assuming that the pre-selected speed has been reached, at that moment the valve 96 closes. The effect of the closure of the valve 96 is to increase the effective area of the diaphragm 68 by the area of the end of the valve 96. The reason for this is that when the valve 96 closes the pressure exerted by the valve 96 downwards on the diaphragm 68 increases so that a greater pressure difference between the venturi 66 and the pressure admitted through the restriction 88 is required to reopen the valve 96. The effect of closing this valve 96 is to establish the pressure in the diaphragm chamber 42, above the diaphragm 38, equal to the pressure in the passage 104, that is to say, the pressure upstream of the orifice 32. The valve 36 closes and the flow of fuel down the passage 22 and up to the burner decreases at a rapid rate. Normally the speed then would fall below the governed speed, the diaphragm 68 would move up because of the reduction in speed reducing the pressure drop which acts on the two sides of the diaphragm 68, and the speed of the gas turbine would fluctuate or "hunt."

The function of the piston 130, the variable chamber 128 and the spring 132 is to prevent such "hunting" taking place. The sudden descent of the pin 140 into the chamber 158 increases the pressure in the chamber 128, despite the fact that the chamber 128 communicates with the chamber 42 through the passage 124. The restriction 126 thus acts as a brake on the displacement of liquid into and out of the chamber 128. The result is that the speed is held at a definite value and the object is to make this speed the speed at which the valve 96 first commences to move from its wide open position. This produces isochronous control of the speed.

When the valve 30 is closed the port 106 is also closed, as shown in Fig. 3. At the same time, as shown in Fig. 2, the semi-annular depression 121 places the passage 119 in communication with the passage 118. This places the pressure below the valve 110 at such a low value that the spring 112 is no longer able to hold the valve 110 in the closed position.

In Fig. 4, by reason of the constant pressure valve 170, there is at all times a constant pressure drop from the passage 34 to the passage 188. By reason of this constant pressure drop the variations in the pressure in the pipe 34 and the variations in the pressure in the pipe 24 do not influence the operation of the device.

The restricted passage 186 insures that there is a minute flow bypassing the valve 52 when the valve 52 is closed.

In Fig. 5 a constant pressure valve is also used and has the same function.

In addition the restricted passages 176 and 178 modify the action of the acceleration bypass valve 52.

Fig. 6 shows the alternative connection for the flow through the acceleration bypass valve 52. Passage 34 then communicates directly with the passage 22 downstream from the valve 36.

What we claim is:

1. A fuel control device for a gas turbine having a source of fuel under pressure, a pressure regulating valve therefor comprising an escape outlet, a valve therein, a moving wall connected to said valve, a spring engaging with said wall, means for exposing the moving wall to the pressure drop in said fuel control device, a manually selected variable fuel orifice located downstream of said escape outlet valve, a second pressure regulating valve located downstream of said variable fuel orifice and adapted to produce a variable pressure drop across said variable orifice, a fuel outlet leading from said second pressure regulating valve to said gas turbine, a second fuel escape outlet passage located downstream from said variable fuel orifice and upstream of said second pressure regulating valve, a partially open throttle valve in said fuel outlet passage, barometric means connected to and adapted to increase the opening of said throttle valve at the higher altitudes.

2. A device as set forth in claim 1 in which there are additional pressure regulating means associated with said throttle valve adapted to maintain a constant pressure drop at said throttle valve.

3. A device as set forth in claim 1 in which there are speed responsive means responsive to the speed of said gas turbine associated with said second pressure regulating valve adapted to reduce the pressure drop at said fuel orifice at high speed.

4. A device as set forth in claim 3 in which there are means associated with said speed responsive means for rendering said means isochronous.

5. A device as set forth in claim 1 in which there is a speed responsive means consisting of a source of hydraulic fluid, a pump connected to said source driven by said gas turbine, a venturi through which the fluid discharged by said pump passes, a second moving wall responsive to the pressure drop in said venturi, a valve controlled by said second moving wall, means adapted to reduce the pressure drop across said variable fuel orifice at a predetermined speed, said means being associated with said second pressure regulating valve.

6. A device as set forth in claim 1 in which there is a speed responsive means consisting of a source of hydraulic fluid, a pump connected to said source driven by said gas turbine, a venturi through which the fluid discharged by said pump passes a second moving wall responsive to the pressure drop on said venturi, a cylindrical valve controlled by said second moving wall, a fuel passage in which said valve reciprocates connected upstream of said variable orifice, a restriction in said passage controlling the pressure drop at said second pressure regulating valve, a passage leading from said cylindrical valve downstream of said second pressure regulating valve, a cylindrical piston of equal area to the area of said cylindrical valve and located on the other side of said moving wall, means for applying low fuel pressure to said cylindrical piston.

7. A device as set forth in claim 1 in which there is a speed responsive means consisting of a source of hydraulic fluid, a pump driven by said gas turbine and connected to said source, a venturi through which the pump discharges hydraulic fluid, a second moving wall responsive to the drop in pressure in the throat of said venturi, a cylindrical shaft concentrically arranged on said second moving wall, a valve on one end, a fuel passage in which said valve reciprocates, said fuel passage being connected upstream of said variable orifice and downstream of said pressure regulating valve, a restriction in said passage, the pressure downstream of said restriction controlling the variable pressure drop across said variable orifice.

GEORGE M. HOLLEY, Jr.
ANDREW WILLIAM ORR, Jr.

REFERENCES CITED

The following references are of record in the file of this patent:

UNITED STATES PATENTS

| Number | Name | Date |
|---|---|---|
| 2,219,994 | Jung | Oct. 29, 1940 |
| 2,405,888 | Holley | Aug. 13, 1946 |
| 2,419,171 | Simpson | Apr. 15, 1947 |